United States Patent Office 3,085,976
Patented Apr. 16, 1963

3,085,976
OIL BASE DRILLING MUD ADDITIVE
Achyut K. Phansalkar and Jack L. Popham, Ponca City, Okla., assignors to Continental Oil Company, Ponca City, Okla., a corporation of Delaware
No Drawing. Filed June 8, 1959, Ser. No. 818,524
14 Claims. (Cl. 252—8.5)

This invention relates to improvements in dry additives suitable for the preparation of drilling muds to be used in the rotary drilling of oil and gas wells. This application is a continuation-in-part of our co-pending application entitled "Oil Base Drilling Mud," Serial No. 688,783 filed October 7, 1957, now abandoned.

In the art of preparing oil base drilling muds, the primary problem is retaining a desired fluid loss control for the mud to prevent loss of a substantial portion of the oil into formations traversed by the well, while retaining a desirable viscosity and gel strength of the mud. At the present time, blown asphalt is the most commonly-used material which is added to an oil carrier to control the fluid loss of the resulting drilling mud; however, to obtain a desirably low fluid loss for the mud, substantial amounts of the blown asphalt must be used, usually from .20 to 30 pounds of asphalt per barrel of oil. In addition, a substantial quantity of soaps of various types are added to the mud to retain the large quantity of blown asphalt, as well as weighting materials, in suspension in the oil. It may also be noted that blown asphalt is effectively blended in an oil carrier only when the oil is heated and the blown asphalt is vigorously stirred into the oil, thereby, as a practical matter, requiring that an oil base drilling mud using blown asphalt be prepared at a central location and shipped to the well site. Facilities for blending the blown asphalt in the oil are usually not available at a drilling location.

Dry oil base drilling mud additives are known in the prior art, but none of these may be prepared as easily as the additive of this invention; furthermore, these prior art materials must be used in quantities substantially greater than our additive. It is of great importance to keep the solid content of the drilling mud as low as possible without sacrificing viscosity and gel strength, because for a given set of drilling conditions the drilling or penetration rate is lowered by the use of a high solids content in the mud. In view of the fact that means are constantly being sought to increase the penetration rate in drilling operations, an additive which may be used in small quantities to prepare a suitable drilling mud is highly desirable.

Our co-pending application Serial No. 688,783, is directed primarily to an additive consisting of a dry particulated mixture for use in preparing a drilling mud, the method of preparing the mixture, and the drilling mud prepared therefrom. The additive described in that application is prepared from solids of a particular size range, a fatty acid such as tall oil, calcium chloride, a small amount of water, and (preferably) a small amount of an emulsifying agent such as sodium stearate.

We have now found that after it has been stored for several months, the additive of Serial No. 688,783 loses some of its effectiveness and does not impart sufficient viscosity to the drilling mud prepared therefrom.

It is an object of this invention to provide an oil base drilling mud additive which may be stored for prolonged periods of time without loss of effectiveness.

It is also an object of this invention to provide an oil base drilling mud additive which when used in smaller quantities is effective to control fluid loss, viscosity and gel strength.

Another object of this invention is to provide an oil base drilling mud additive which may be easily and efficiently prepared, packaged, and shipped to the drilling location.

A further object of this invention is to provide an oil base drilling mud prepared by using any desired petroleum oil.

A still further object of this invention is to provide an economical oil base drilling mud utilizing readily available materials.

Other objects and advantages of the invention will be evident from the following detailed description.

Broadly stated, the present invention may be defined as an oil base drilling mud dry additive comprising about 5 parts of a saturated fatty acid in granulated form having an iodine number less than 16 and containing at least 12 carbon atoms, at least about 2 parts of finely-divided inert solids, and at least about 1 part of finely-divided inert solid absorbent material.

The preferred additive of our invention is composed of stearic acid, oyster shell flour, and diatomaceous earth in approximately the following proportions.

| Component: | No. of parts by weight |
|---|---|
| Stearic acid (granulated form) | 5 |
| Oyster shell flour | 2 |
| Diatomaceous earth (all material passing through a 200-mesh) | 1 |

Several grades of stearic acid may be used. In general, any grade which possesses an iodine number between 0 and 16 will be acceptable.

Other saturated fatty acids or combinations of saturated fatty acids may be substituted for the stearic acid, but again the iodine number should be less than 16 and the acids used should contain at least 12 carbon atoms and preferably 16–20 carbon atoms. Fatty acids of low iodine number are required in the present invention because they comprise the saturated fatty acids, which are more stable than the unsaturated acids. The unsaturated fatty acids are prone to auto-oxidation followed by breakdown of the acid resulting in loss of gelling properties of the additive prepared therefrom. Another reason why fatty acids of low iodine number are required is that such materials are solid and may be obtained in granulated form. The number of carbon atoms should be at least 12 and preferably 16–20, to assure that the additive will have the desired gelling properties. Suitable fatty acid-containing materials other than stearic acid include—by way of example and not by way of limitation—hydrogenated tallow fatty acids and hydrogenated cotton seed oil fatty acids.

The primary function of the oyster shell flour is to provide fluid loss properties to the drilling mud prepared from our additive. Oyster shell flour is highly desirable because it is cheaper, readily available, inert to the fatty acid used, and effective for the intended purpose. It will be obvious to those skilled in the art that other finely-divided inert solids may be substituted for oyster shell flour, such as any other form of finely-divided calcium carbonate, ground walnut shells, silica flour, and the like.

The primary function of the diatomaceous earth is to keep the oily particles or beads of fatty acid dry and free-flowing during storage and transportation. Here again it will be obvious that equivalent materials which are finely-divided solids inert to the fatty acid may be employed to impart the desired dry, free-flowing characteristics to the additive. For example, a dry powdered form of calcium silicate such as Microcel "E" (Johns-Manville Corporation) or a dry powdered aluminum silicate such as Sil Flo Fines (Sil Flo Corporation) may be employed in place of the diatomaceous earth.

Although the primary functions of the two inert solid materials are as indicated above, it is believed that each in limited degree performs the function of the other; that is, the oyster shell flour to some extent aids in keeping the additive dry and free-flowing, and the diatomaceous earth aids in providing fluid loss to the drilling mud.

As indicated above, the preferred formulation contains 5 parts of granulated fatty acid, at least about 2 parts of finely-divided inert solids, and at least about 1 part of finely-divided inert solid absorbent material. These quantities are merely the approximate minimum amounts preferred from an economic standpoint, and greater quantities of both of the finely-divided inert materials may be used without detracting from the effectiveness of the additive.

Inasmuch as the acid is in solid granulated form, such acid may be readily blended with the two finely-divided inert materials in any convenient manner to provide a dry mixture which may be easily packaged and shipped for use at the drilling site.

At the drilling site the additive is mixed with caustic soda in the approximate proportion of ½ part by weight of caustic to 1 part by weight of acid. From about 3 to about 12 pounds of the additive are required per barrel of oil to prepare a suitable oil base drilling mud. High gravity oils (42° API) require approximately 12 pounds per barrel, whereas the lower gravity crudes (20° API) require about 3 pounds per barrel.

Any desired petroleum oil may be used to prepare a suitable drilling mud from the additive of this invention. The oil may be either refined or crude, and any oil readily available at the drilling location may be used.

To illustrate the results obtainable by the use of drilling muds prepared from the preferred additive of this invention, several tests have been run, and the results are set forth in the table. The fluid loss figures presented in the table were obtained by the standard API field procedure for testing drilling fluids, Section V, API Test RP 29, May 1950, except that the pressure employed was 1000 p.s.i. instead of 100 p.s.i., and determinations were made at 125° F. in addition to 75° F.

*Table*

| Crude | Ten-sleep | Grubb | McElroy | Cutright | Chittim |
|---|---|---|---|---|---|
| API gravity | 28.2 | 31.0 | 33.5 | 37.0 | 39.5 |
| Viscosity, centiposes—75° F. | 28.5 | 15 | 7.5 | 8 | 6 |
| Zero gel, lb./100 sq. ft., 75° F. | 1 | 0 | 0 | 0 | 0 |
| F.L., 1,000 p.s.i., 75° F., percent | 100 | 100 | 100 | 100 | 85.0 |
| Lbs./bbl. additive | 4.0 | 4.0 | 4.0 | 4.0 | 4.0 |
| ccs. NaOH (50%) | 2.5 | 2.5 | 2.5 | 2.5 | 2.5 |
| Viscosity, cps., 75° F. | 42 | 34.5 | 14.5 | 16 | 15 |
| Zero gel, 75° F. | 1 | 5 | 1 | 1 | 4 |
| F.L., 1,000 p.s.i., 75° F. | 5.0 | 1.6 | 8.1 | 11.0 | 11.0 |
| F.L., 1,000 p.s.i., 125° F. | 10.9 | 7.0 | 18.0 | 18.9 | 19.8 |
| Lbs./bbl. additive | 8.0 | 8.0 | 8.0 | 8.0 | 8.0 |
| ccs. NaOH (50%) | 5.0 | 5.0 | 5.0 | 5.0 | 5.0 |
| Viscosity, cps., 75° F. | 60 | 48.5 | 23 | 23 | 26 |
| Zero gel, 75° F. | 4 | 12 | 4 | 4 | 10 |
| F.L., 1,000 p.s.i., 75° F. | 5.5 | 1.9 | 8.0 | 8.8 | 8.9 |
| F.L., 1,000 p.s.i., 125° F. | 7.1 | 2.9 | 12.0 | 12.5 | 14.0 |
| Lbs./bbl. additive | 12.0 | 12.0 | 12.0 | 12.0 | 12.0 |
| ccs. NaOH | 7.5 | 7.5 | 7.5 | 7.5 | 7.5 |
| Viscosity, cps., 75° F. | 58.5 | 68 | 30 | 30.5 | 30.5 |
| Zero gel, 75° F. | 7 | 33 | 10 | 10 | 16 |
| F.L., 1,000 p.s.i., 75° F. | 4.9 | 2.5 | 6 | 6.8 | 8.0 |
| F.L., 1,000 p.s.i., 125° F. | 6.8 | 3.0 | 10.2 | 10.0 | 13.9 |

VISCOSITY AT ELEVATED TEMPERATURE

| | | | | | |
|---|---|---|---|---|---|
| Lbs./bbl. additive | 12.0 | 12.0 | 12.0 | 12.0 | 12.0 |
| ccs. NaOH (50%) | 7.5 | 7.5 | 7.5 | 7.5 | 7.5 |
| Viscosity, cps., 140° F. | 47.5 | 63.5 | 25 | 24 | 22 |
| Zero gel, 140° F. | 12 | 31 | 12 | 12 | 11 |

VISCOSITY AND FLUID LOSS WITH 20% MUD CONTAINING 20% (BY VOLUME) WATER

| | | | | | |
|---|---|---|---|---|---|
| Viscosity, cps., 75° F. | 150+ | 150+ | 77.5 | 71.5 | |
| F.L., 1,000 p.s.i., 125° F. | 12.0 | 6.8 | 14.0 | 15.6 | |

If desired, weighting materials may also be added to the mud at the drilling location to increase the density as required by drilling conditions. It will be noted that the oyster shell flour is of sufficient density to act in limited degree as a weighting material, although additional weighting materials commonly known to those skilled in the art may be added, if needed.

From the foregoing it will be apparent that the present invention provides an economical dry additive suitable for use in relatively small quantities for the preparation of an effective oil base drilling mud having desirable fluid loss, viscosity and gel strength properties. The dry additive is easily prepared from readily available materials, and may be conveniently packaged and shipped to the drilling location in dry form for mixing in the field, thereby minimizing transportation problems.

While specific details of the preferred embodiments of the invention have been given in the foregoing for purposes of illustration, it is to be understood that the invention is not limited thereby, but is to be taken as limited solely by the language of the appended claims.

We claim:

1. A dry additive for use in the preparation of oil base drilling muds consisting essentially of:
    (a) about 5 parts by weight of a solid granulated saturated fatty acid having an iodine number less than 16 and containing at least 12 carbon atoms;
    (b) at least about 2 parts by weight of finely-divided solids inert to said fatty acid, said solids being selected from the group consisting of finely-divided calcium carbonate, ground walnut shell, and silica flour; and
    (c) at least about 1 part by weight of finely-divided solid absorbent material, said material being inert to the fatty acid and being selected from the group consisting of diatomaceous earth, dry powdered calcium silicate, and dry powdered aluminum silicate.

2. The additive composition of claim 1 in which the fatty acid contains at least 16 carbon atoms.

3. The additive composition of claim 1 in which the fatty acid contains from 16–20 carbon atoms.

4. The additive composition of claim 1 in which the fatty acid is stearic acid.

5. The additive composition of claim 1 in which the fatty acid is stearic acid and the finely-divided solids are calcium carbonate.

6. The additive composition of claim 5 in which the fatty acid is stearic acid and the calcium carbonate is in the form of oyster shell flour.

7. A dry additive for use in the preparation of oil base drilling muds consisting essentially of about 5 parts of stearic acid in solid granulated form, at least about 2 parts by weight of oyster shell flour, and at least about 1 part by weight of finely-divided diatomaceous earth.

8. An oil base drilling mud comprising a crude petroleum oil containing from about 3 to about 12 pounds of the composition of claim 1 per barrel of said oil, and about ½ part by weight of caustic soda per part of said fatty acid.

9. An oil base drilling mud comprising a crude petroleum oil containing from about 3 to about 12 pounds of the composition of claim 2 per barrel of said oil, and about ½ part by weight of caustic soda per part of said fatty acid.

10. An oil base drilling mud comprising a crude petroleum oil containing from about 3 to about 12 pounds of the composition of claim 3 per barrel of said oil, and about ½ part by weight of caustic soda per part of said fatty acid.

11. An oil base drilling mud comprising a crude petroleum oil containing from about 3 to about 12 pounds of the composition of claim 4 per barrel of said oil, and about ½ part by weight of caustic soda per part of said fatty acid.

12. An oil base drilling mud comprising a crude petroleum oil containing from about 3 to about 12 pounds of the composition of claim 5 per barrel of said oil, and about ½ part by weight of caustic soda per part of said fatty acid.

13. An oil base drilling mud comprising a crude petroleum oil containing from about 3 to about 12 pounds of the composition of claim 6 per barrel of said oil, and about ½ part by weight of caustic soda per part of said fatty acid.

14. An oil base drilling mud comprising a crude petroleum oil containing from about 3 to about 12 pounds of the composition of claim 7 per barrel of said oil, and about ½ part by weight of caustic soda per part of said fatty acid.

References Cited in the file of this patent

UNITED STATES PATENTS

| Number | Name | Date |
|---|---|---|
| 2,099,825 | Rolshausen et al. | Nov. 23, 1937 |
| 2,297,660 | Mazee | Sept. 29, 1942 |
| 2,350,154 | Dawson et al. | May 30, 1944 |
| 2,363,499 | Campbell et al. | Nov. 28, 1944 |
| 2,461,483 | Self | Feb. 8, 1949 |
| 2,515,742 | Snyder | July 18, 1950 |
| 2,779,735 | Brown et al. | Jan. 29, 1957 |
| 2,793,996 | Lummus | May 28, 1957 |
| 2,861,042 | Watkins | Nov. 18, 1958 |
| 2,862,881 | Reddie | Dec. 2, 1958 |
| 2,876,197 | Watkins | Mar. 3, 1959 |